(12) United States Patent
Chang

(10) Patent No.: US 7,758,023 B2
(45) Date of Patent: Jul. 20, 2010

(54) CARGO BRACING DEVICE

(76) Inventor: Vincent Chang, No. 15-10, Lane 142, Sec. 5, Changnan Road, Changhua 50088 (TW)

( * ) Notice: Subject to any disclaimer, the term of this patent is extended or adjusted under 35 U.S.C. 154(b) by 511 days.

(21) Appl. No.: 11/827,582

(22) Filed: Jul. 11, 2007

(65) Prior Publication Data

US 2009/0013511 A1  Jan. 15, 2009

(51) Int. Cl.
 *B25B 25/00* (2006.01)
(52) U.S. Cl. .................... 254/218; 24/70 ST; 24/71 ST; 24/68 CD; 254/223; 254/238
(58) Field of Classification Search ........................ None
See application file for complete search history.

(56) References Cited

U.S. PATENT DOCUMENTS

| 4,199,182 A | 4/1980 | Sunesson | 254/79 |
| 4,781,499 A | 11/1988 | Wisecarver | 410/151 |
| 5,369,848 A * | 12/1994 | Huang | 24/68 CD |
| 5,443,342 A | 8/1995 | Huang | 410/151 |
| 5,769,580 A | 6/1998 | Purvis | 410/151 |
| 5,947,666 A | 9/1999 | Huang | 410/151 |
| 6,007,053 A | 12/1999 | Huang | 254/247 |
| 6,908,073 B1 * | 6/2005 | Hsien | 254/218 |

* cited by examiner

*Primary Examiner*—Jack W. Lavinder
(74) *Attorney, Agent, or Firm*—Wang Law Firm; Li K. Wang

(57) ABSTRACT

A cargo bracing device includes a base having two side plates for rotatably attaching a reel drum, one or more toothed discs attached to the reel drum and controlled to rotate relative to the base with a stop, an operating arm having two legs rotatably attached to the reel drum, a catch device attached to the operating arm and engaged with the toothed disc, and an anchoring device may detachably anchor the legs of the operating arm to the reel drum, and the legs of the operating arm may be selectively disengaged from the reel drum to prevent the operating arm from being operated by unauthorized persons, and for preventing the cargo from being stolen by the unauthorized persons.

8 Claims, 11 Drawing Sheets

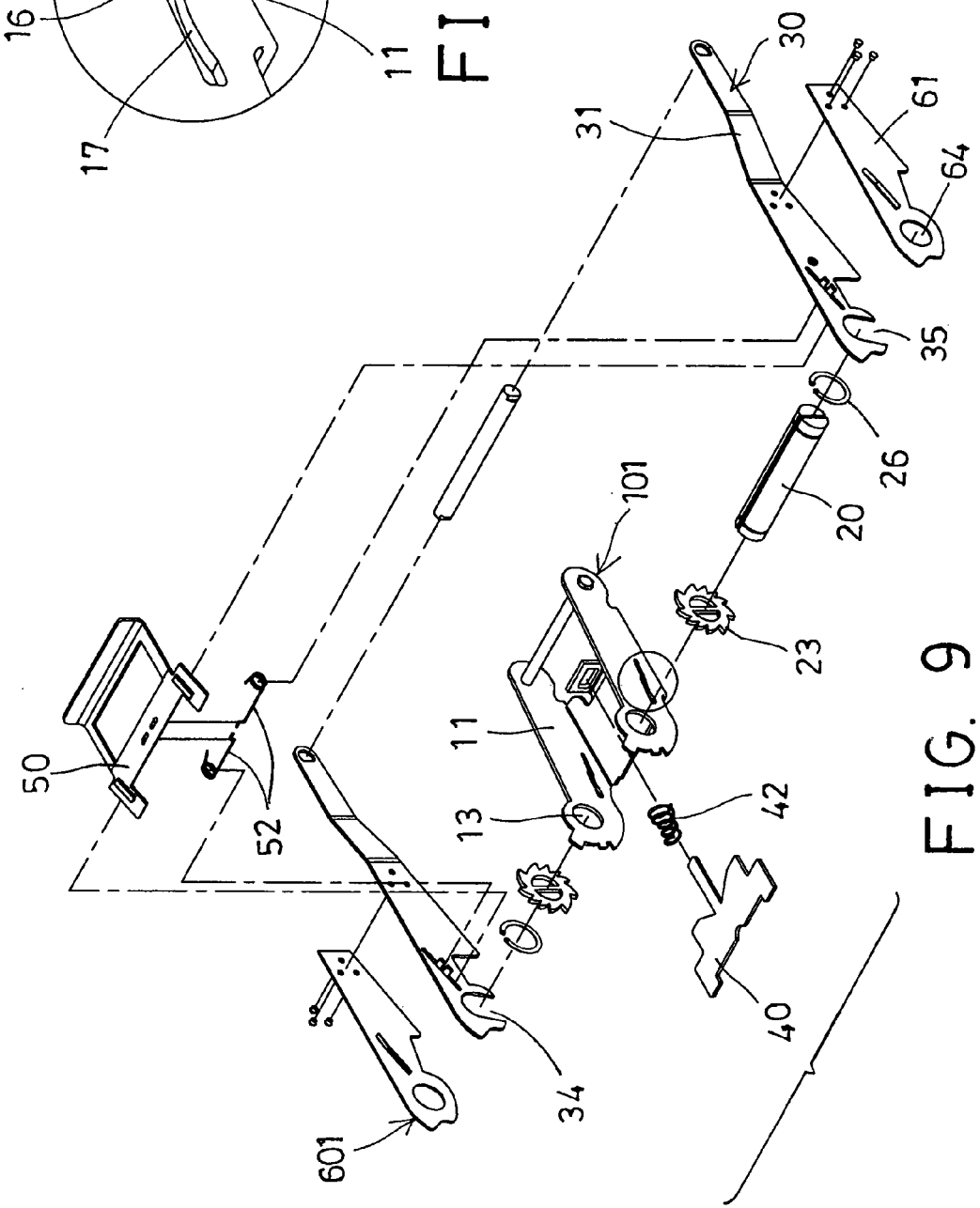

CARGO BRACING DEVICE

BACKGROUND OF THE INVENTION

1. Field of the Invention

The present invention relates to a strapping device or a cargo bracing or tie-down or fastening device, and more particularly to a cargo bracing device including an actuating handle selectively detached or disassembled or disengaged from the cargo bracing device for preventing the cargo bracing device from being operated or actuated by unauthorized persons.

2. Description of the Prior Art

Typical cargo bracing or tie-down or fastening device or strapping devices comprise two arms pivotally mounted about a reel drum on which are mounted toothed discs which turn with the drum, the first arm includes a first catch engaged with the teeth of the disc teeth for preventing the belt and the reel drum from being rotated reversely and for allowing the belt to be wound onto the reel drum, and the second arm includes a second catch engaged with the teeth of the disc teeth for preventing the belt and the reel drum from being rotated reversely when the belt and the reel drum are pivoting relative to the arms.

For example, U.S. Pat. No. 4,199,182 to Sunesson, and U.S. Pat. No. 5,369,848 to Huang, and U.S. Pat. No. 6,007,053 to Huang disclose three of the typical devices for tightening and locking load-fastening belts each also comprising two arms pivotally mounted about a reel drum for winding or tighting the belt with the reel drum by pivoting or rotating the arms relative to each other.

However, after the belt is wound or tightened onto the reel drum by the arms, one of the arms or the pivoting arm may not be removed or detached or disassembled or disengaged from the strapping device such that the belt may also be easily unwound or released from the reel drum with the arms by the unauthorized persons. For example, it will be dangerous and the cargo may fall down when the arms are operated or actuated by such as the children inadvertently.

U.S. Pat. No. 4,781,499 to Wisecarver, U.S. Pat. No. 5,443,342 to Huang, U.S. Pat. No. 5,769,580 to Purvis, and U.S. Pat. No. 5,947,666 to Huang disclose four of the typical cargo bracing or tie-down or fastening devices or strapping devices each comprising an inner pipe having a toothed rack disposed or provided thereon, an outer pipe slidably engaged onto the inner pipe and movable or adjustable relative to the inner pipe, and a straight movable arm having a gear engaged with the toothed rack for moving the inner pipe relative to the outer pipe and thus for positioning the cargo bracing devices onto the vehicles, between two walls, or the other objects.

However, similarly, after the inner pipe is moved relative to the outer pipe and tightened or positioned onto the vehicles, between two walls, or the other objects, the straight movable arm also may not be removed or detached or disassembled or disengaged from the typical cargo bracing devices such that the typical cargo bracing devices may also be easily unfastened or released from the vehicles or walls or objects with the straight movable arm by the unauthorized persons.

The present invention has arisen to mitigate and/or obviate the afore-described disadvantages of the conventional cargo bracing or tie-down or fastening devices or strapping devices.

SUMMARY OF THE INVENTION

The primary objective of the present invention is to provide a cargo bracing device including an actuating handle selectively detached or disassembled or disengaged from the cargo bracing device for preventing the cargo bracing device from being operated or actuated by unauthorized persons.

In accordance with one aspect of the invention, there is provided a cargo bracing device comprising a base including two side plates, the side plates each including an orifice formed therein, a reel drum rotatably engaged in the orifices of the side plates of the base for rotatably attaching the reel drum to the base, at least one toothed disc attached to the reel drum and rotated in concert with the reel drum, and including a plurality of disc teeth provided thereon, a spring-biased stop slidably attached to the base and engaged with the disc teeth of the toothed disc, for limiting the toothed disc and the reel drum to rotate relative to the base in an active direction and for preventing the reel drum from being rotated in a reverse direction relative to the base, an operating arm including two legs rotatably attached to the reel drum, and including an opening formed in each of the legs for receiving the reel drum and for detachably attaching the legs of the operating arm to the reel drum, and the opening of at least one of the legs including an open portion for allowing the legs to be selectively disengaged from the reel drum, a spring-biased catch device slidably attached to the operating arm and engaged with the disc teeth of the toothed disc, for allowing the toothed disc and the reel drum to be rotated relative to the base by the operating arm in the active direction and for preventing the reel drum from being rotated in the reverse direction relative to the base by the operating arm, and at least one anchor member attached to one of the legs of the operating arm, and including a perforation formed therein for selectively engaging with the reel drum and for detachably anchoring the legs of the operating arm to the reel drum, and thus for preventing the operating arm of the cargo bracing device from being operated or actuated by unauthorized persons.

The anchor member includes a first end secured to the leg of the operating arm, and a second end having the perforation formed therein.

The catch device is engageable with the anchor member for selectively disengaging the perforation of the anchor member from the reel drum when the catch device is moved relative to the operating arm.

The anchor member includes a recess formed therein for slidably receiving the catch device. The anchor member includes a bulge extended outwardly therefrom and having the recess formed therein. The anchor member includes an inclined surface formed in the bulge for engaging with the catch device.

The reel drum includes two drum halves spaced away from each other for forming a strap receiving slot between the drum halves, the toothed disc includes two apertures formed therein for solidly receiving the drum halves of the reel drum respectively and for allowing the toothed disc to be rotated in concert with the reel drum.

The base includes a channel formed in each of the side plates for slidably receiving or attaching the stop. The operating arm includes a groove formed in each of the legs for slidably receiving or attaching the catch device.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 9 is an exploded view similar to FIG. 1, illustrating the other application or arrangement of the cargo bracing device;

FIG. 10 is an enlarged partial perspective of the cargo bracing device as shown in FIG. 9;

DETAILED DESCRIPTION OF THE PREFERRED EMBODIMENT

Figure 1:
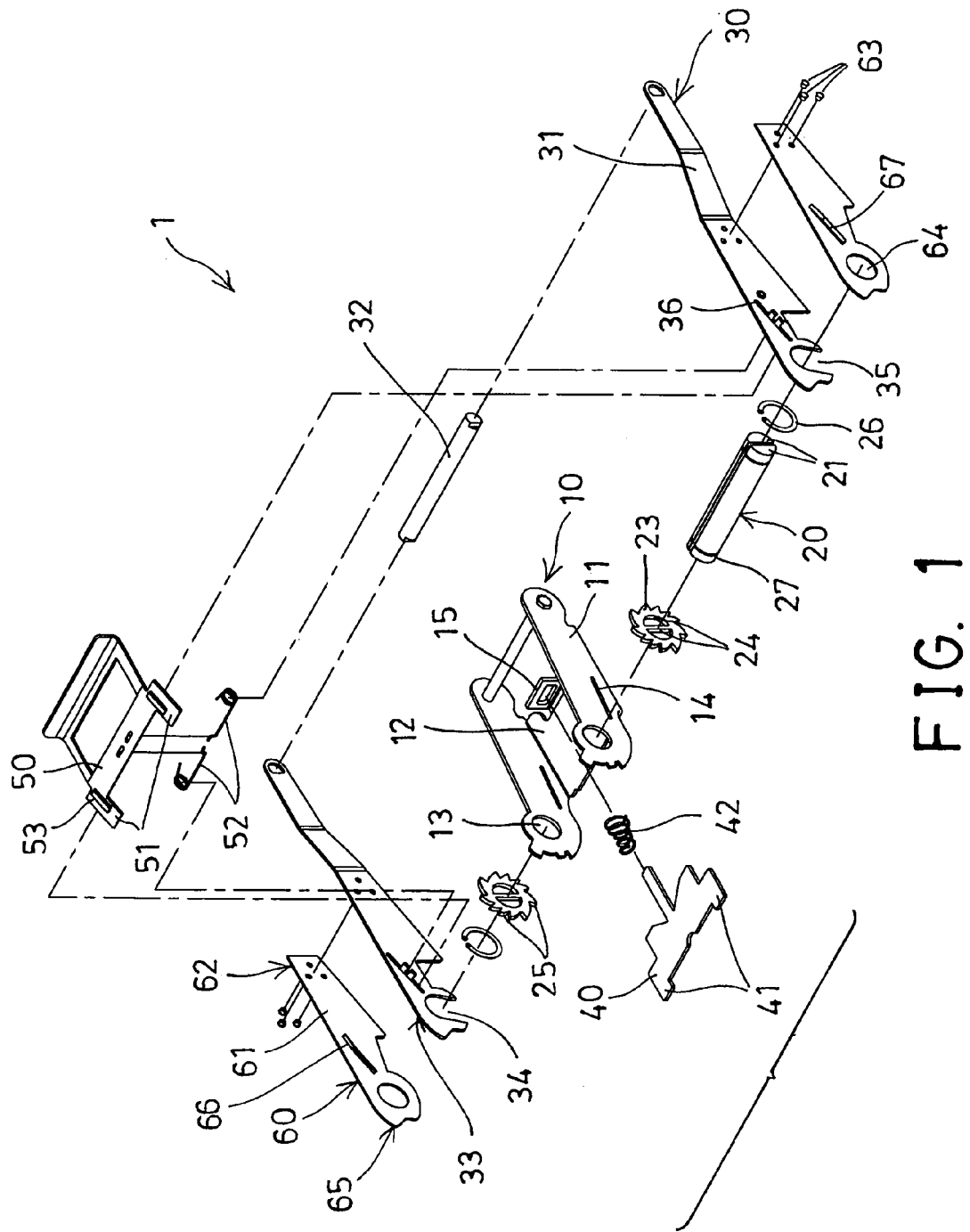
FIG. 1 is an exploded view illustrating an application of a cargo bracing device in accordance with the present invention.
Figure 2:
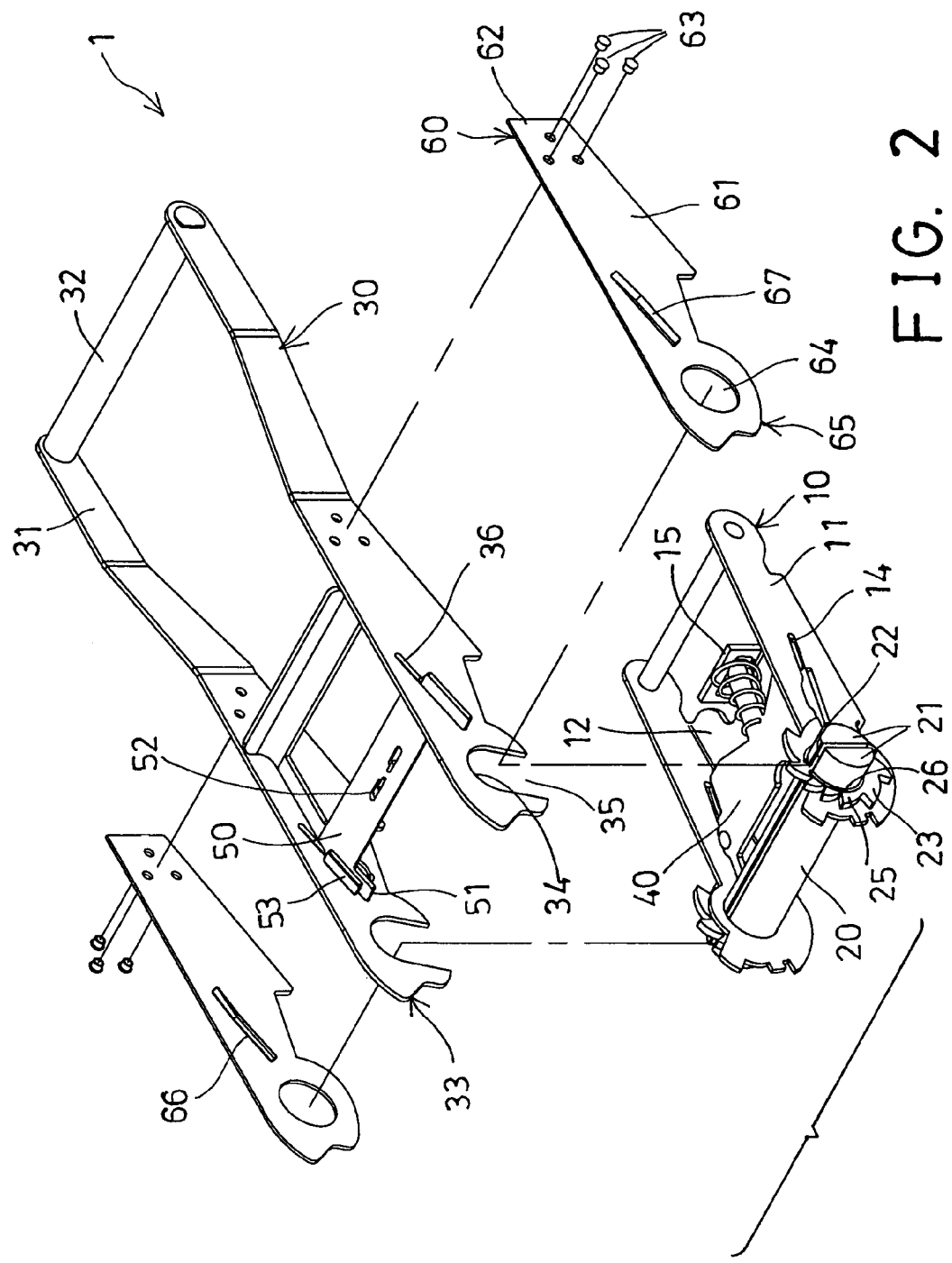
FIG. 2 is a partial exploded view of the cargo bracing device.

Referring to the drawings, and initially to FIGS. 1-5, a cargo bracing device 1 in accordance with the present invention comprises two arms or a base 10 and an operating arm 30 to be pivotally coupled together or pivotally mounted about a reel drum 20, for example, the base 10 includes two side walls or plates 11 extended or dependent upwardly from a lateral or upper or base wall or plate 12, the side plates 11 each include an orifice 13 formed therein for rotatably receiving the reel drum 20, the reel drum 20 includes two drum halves 21 spaced away from each other for forming or defining a strap receiving slot 22 between the two drum halves 21, and one or more (such as two) toothed discs 23 attached or mounted or secured to the reel drum 20.

For example, the toothed discs 23 each include two apertures 24 formed therein for receiving the end portions of the drum halves 21 of the reel drum 20 respectively and for allowing the toothed discs 23 to be turned or rotated in concert with the reel drum 20. The toothed discs 23 each further include a number of disc teeth 25 provided or formed thereon, and one or more (such as two) clamping or retaining rings 26 are attached or engaged with the reel drum 20, such as engaged with the peripheral depressions 27 the reel drum 20 for engaging with the side plates 11 and for anchoring or positioning the reel drum 20 to the base 10 and for preventing the reel drum 20 from being moved laterally relative to the base 10 and for preventing the reel drum 20 from being disengaged from the base 10.

The base 10 includes a channel 14 formed in each of the side plates 11 for slidably attaching or receiving a spring-biased stop 40 which includes one or more (such as two) limbs 41 for engaging with the disc teeth 25 of the toothed discs 23 and for guiding or limiting the toothed discs 23 and the reel drum 20 to rotate relative to the base 10 in one or an active direction only and for preventing the reel drum 20 from being rotated in a reverse direction relative to the base 10 and thus for allowing the reel drum 20 to rotate only in the active direction relative to the base 10. The base 10 includes a peg 15 formed on the base plate 12 for engaging with a spring member 42 which may bias or force the limbs 41 of the stop 40 to engage with the disc teeth 25 of the toothed discs 23 and for guiding or limiting the toothed discs 23 and the reel drum 20 to rotate relative to the base 10, and thus for allowing the toothed discs 23 and the reel drum 20 to rotate in the active direction relative to the base 10 step by step.

The operating arm 30 includes two legs 31 disposed or arranged parallel to each other, and one or more rods 32 straddled or secured between the legs 31 for reinforcing the legs 31 and for forming a stable or solid structure for the operating arm 30. The legs 31 each include a free end or a mounting portion 33 having an opening 34 formed therein and an open portion 35 formed in the outer portion of the opening 34 of the legs 31 in order to form the opened opening 34 for the legs 31, or the opening 34 of the legs 31 includes an open portion 35, and thus for allowing the end portions of the reel drum 20 to be engaged into the opened opening 34 of the legs 31 respectively, and/or for allowing the legs 31 of the operating arm 30 to be rotatably attached or mounted or secured or engaged onto the reel drum 20. The operating arm 30 further includes a groove 36 formed in each of the legs 31 for slidably receiving a spring-biased catch device 50.

The spring-biased catch device 50 includes one or more (such as two) pawls 51 for engaging with the disc teeth 25 of the toothed discs 23 and for allowing the toothed discs 23 and the reel drum 20 to be forced to rotate relative to the base 10 in the active direction by the operating arm 30. One or more (such as two) spring members 52 are engaged between the legs 31 the operating arm 30 and the catch device 50 for biasing or forcing the pawls 51 of the catch device 50 to engage with the disc teeth 25 of the toothed discs 23 and for allowing the toothed discs 23 and the reel drum 20 to be rotated relative to the base 10 by the operating arm 30 in the active direction, or for allowing the operating arm 30 to be rotated freely relative to the reel drum 20 in the reverse direction, but not to be rotated relative to the reel drum 20 in the active direction, and thus for allowing the belt (not shown) to be wound onto the reel drum 20 step by step. The spring-biased catch device 50 may include one or more (such as two) guides 53 extended therefrom for engaging with the legs 31 and for guiding the spring-biased catch device 50 to smoothly slide or move relative to the operating arm 30.

The cargo bracing device 1 further includes a locking or anchoring or securing means or device 60 for selectively and detachably anchoring or securing or retaining the legs 31 of the operating arm 30 to the reel drum 20, and for preventing the legs 31 of the operating arm 30 from being disengaged from the reel drum 20 and the base 10. For example, the anchoring means or device 60 includes one or more (such as two) anchor members 61 each having one end 62 attached or mounted or secured to the respective legs 31 of the operating arm 30 with such as fasteners 63 respectively, and a perforation 64 formed in each of the other end 65 thereof for selectively engaging with the reel drum 20 and thus for detachably anchoring or securing or retaining the legs 31 of the operating arm 30 to the reel drum 20. The anchor members 61 of the anchoring means or device 60 each include a recess 66 formed therein for slidably receiving the spring-biased catch device 50.

For example, as shown in FIGS. 1-2 and 6-8, the anchor members 61 each include a bulge 67 extended outwardly therefrom and having the recess 66 formed therein for slidably receiving the spring-biased catch device 50, and each include an inclined surface 68 formed in the bulge 67 (FIG. 8) for engaging with the spring-biased catch device 50, and for allowing the anchor members 61 of the anchoring means or device 60 to be selectively moved outwardly or away from the legs 31 of the operating arm 30 respectively by the spring-biased catch device 50 (FIGS. 6, 7) when the spring-biased catch device 50 is pulled or moved away from the toothed discs 23 against the spring members 52, and thus for allowing the perforations 64 or the other ends 65 of the anchor members 61 to be selectively removed or disengaged from the reel drum 20 by the spring-biased catch device 50.

Figure 3:
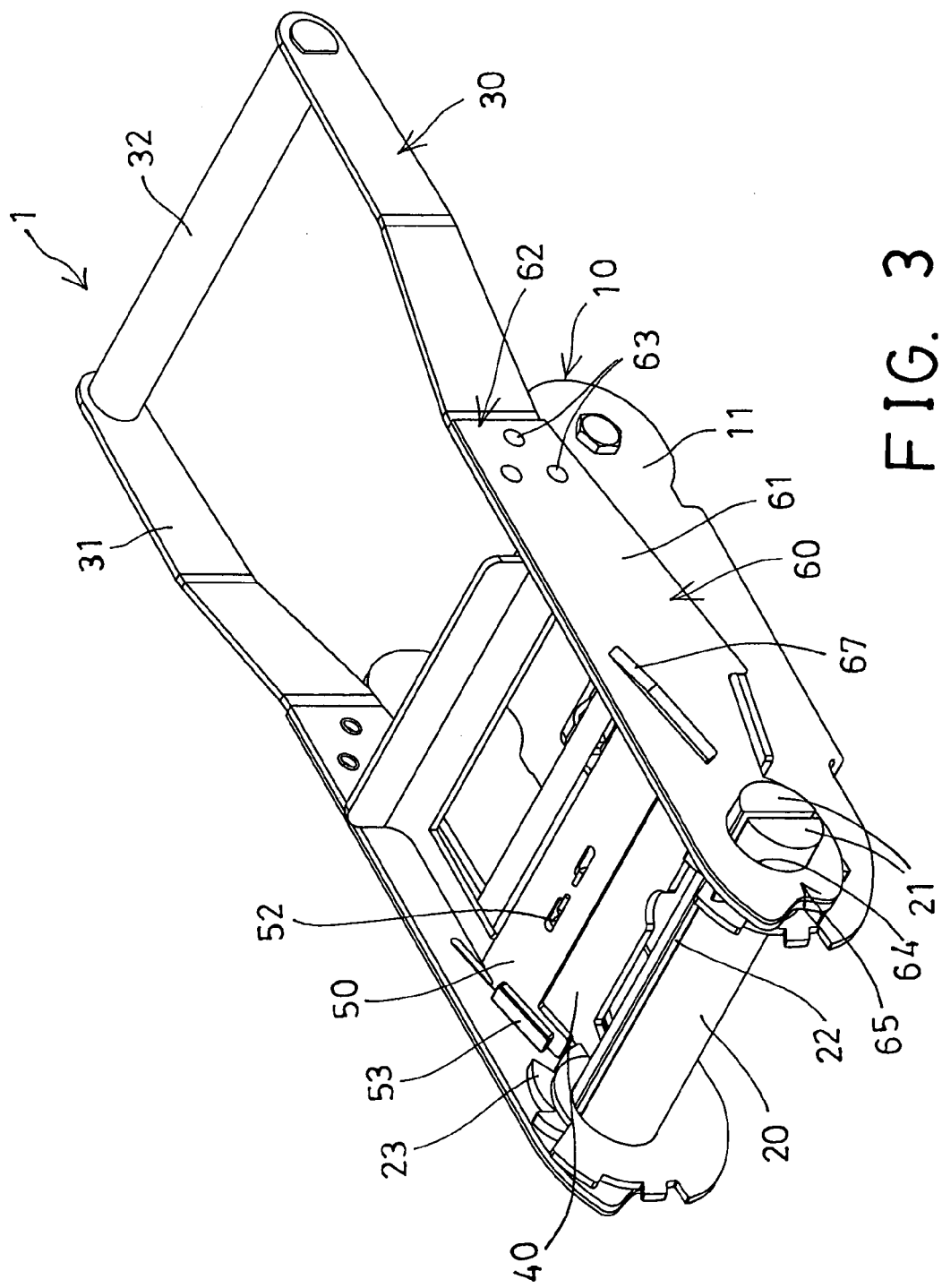
FIG. 3 is a perspective view of the cargo bracing device.
Figure 4:
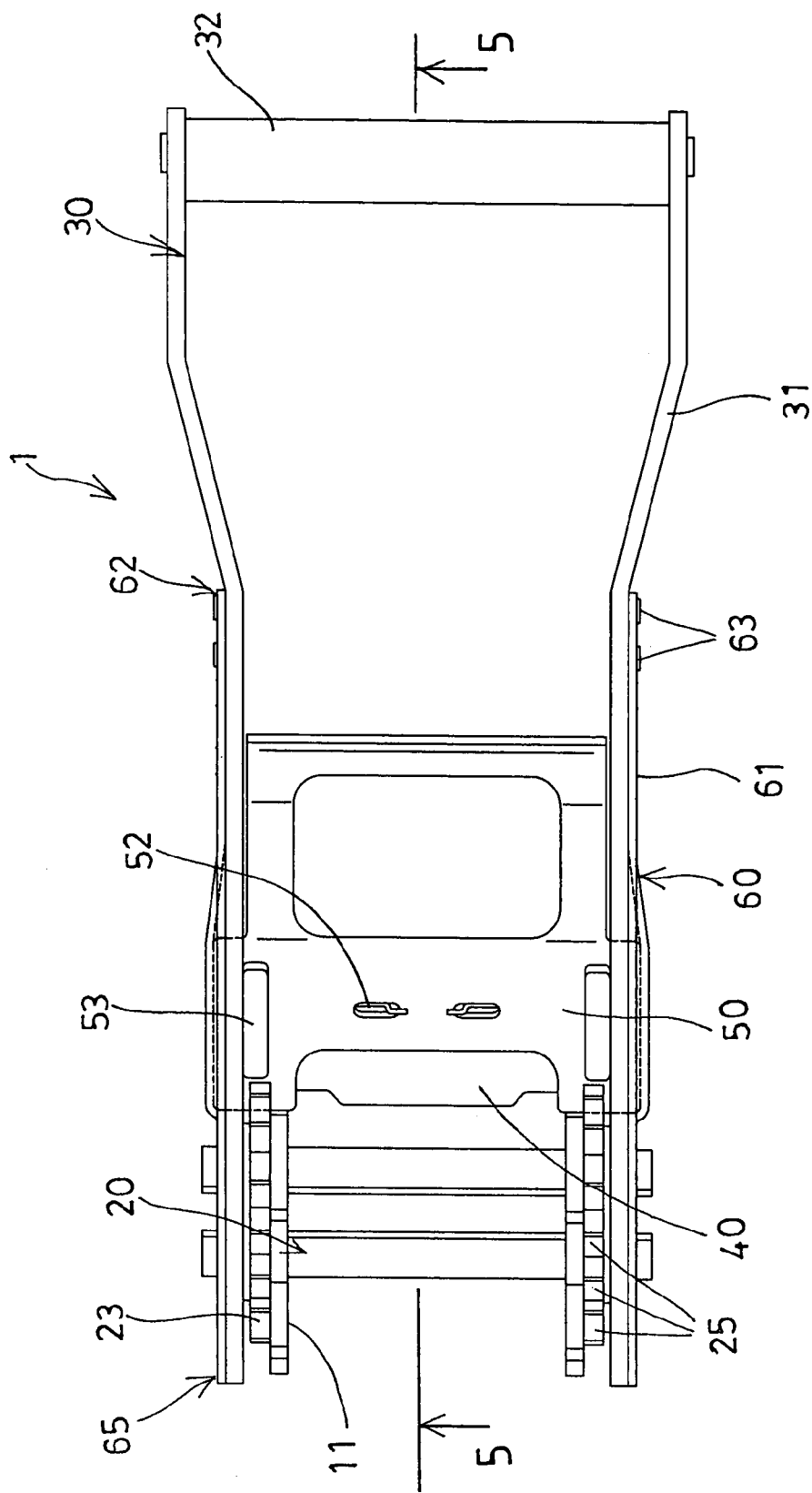
FIG. 4 is a top plan schematic view of the cargo bracing device.
Figure 5:
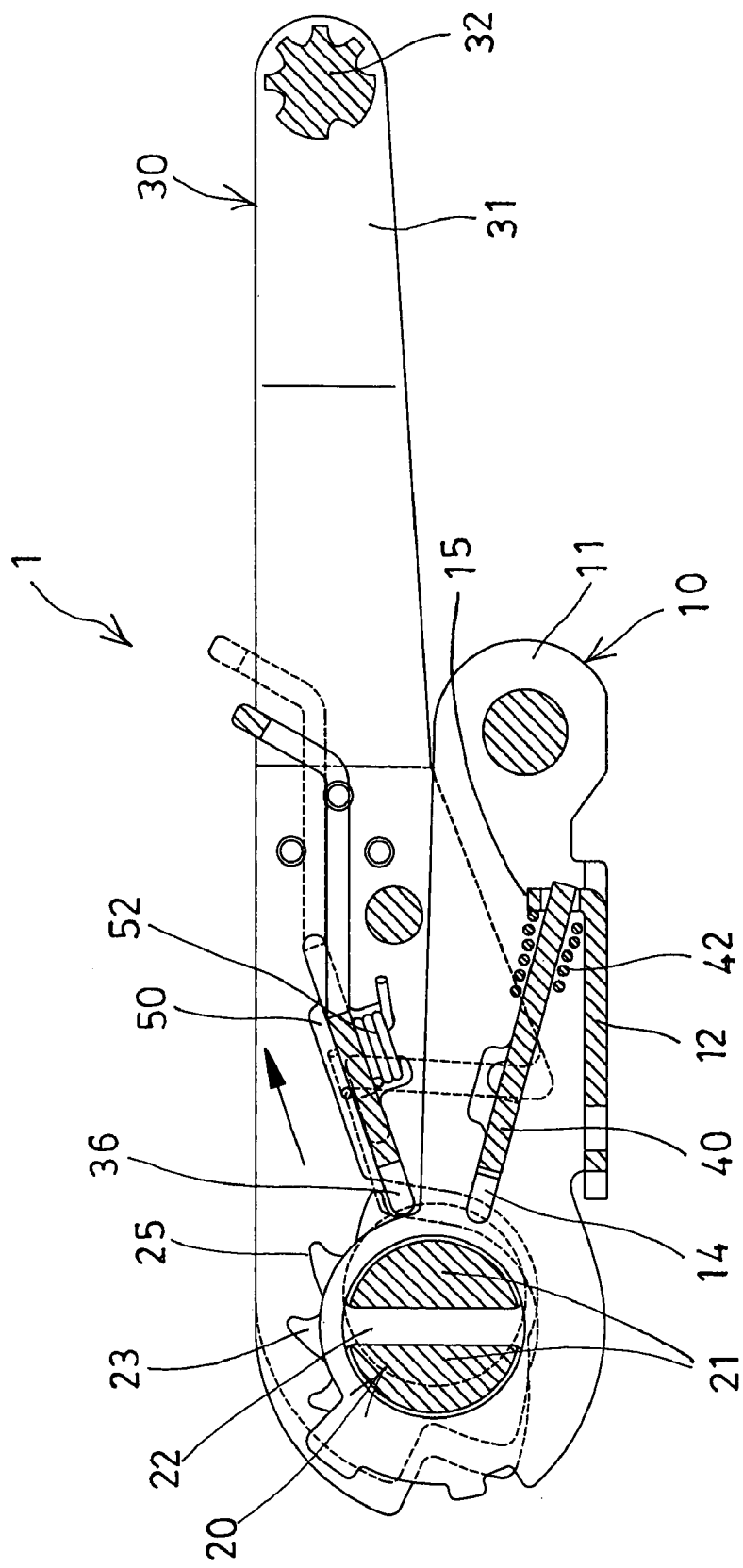
FIG. 5 is a cross sectional view of the cargo bracing device taken along lines 5-5 of FIG. 4.
Figure 6:
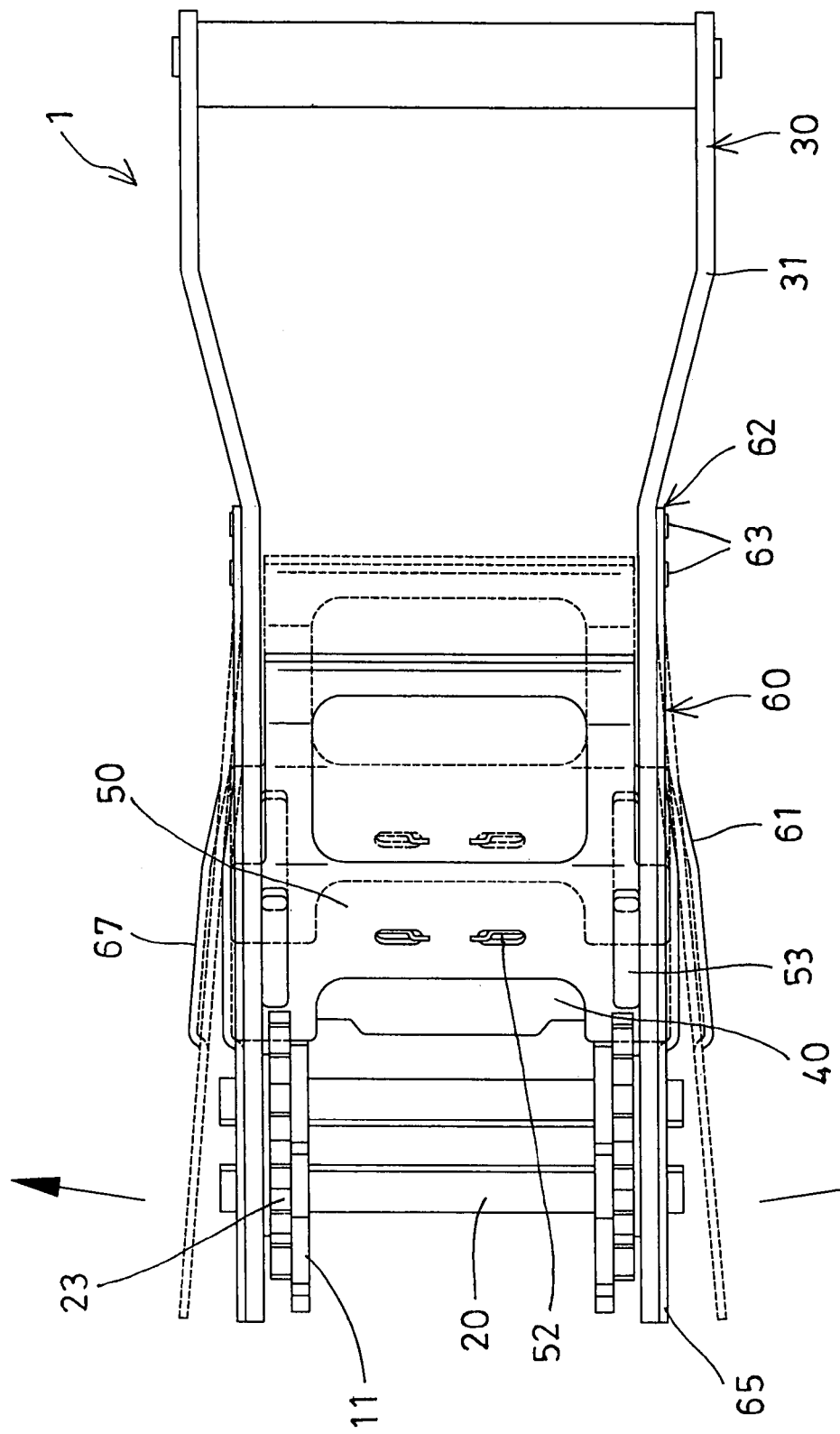
FIGS. 6, 7 are top plan schematic views similar to FIG. 4 illustrating the operation of the cargo bracing device.

In operation, as shown in FIGS. 3-5, the limbs 41 of the stop 40 may be biased or forced to engage with the disc teeth 25 of the toothed discs 23 by the spring members 42 for limiting and allowing the toothed discs 23 and the reel drum 20 to rotate relative to the base 10 in the active direction, i.e. clockwise relative to the base 10, and for preventing the reel drum 20 from being rotated in the reverse direction, i.e. counterclockwise relative to the base 10, or for preventing the belt and the reel drum 20 from being rotated reversely, i.e. counterclockwise relative to the base 10. At this moment, the toothed discs 23 and the reel drum 20 may be forced to rotate relative to the base 10 in the active direction, i.e. clockwise relative to the base 10, by the operating arm 30 and the catch device 50.

Figure 8:
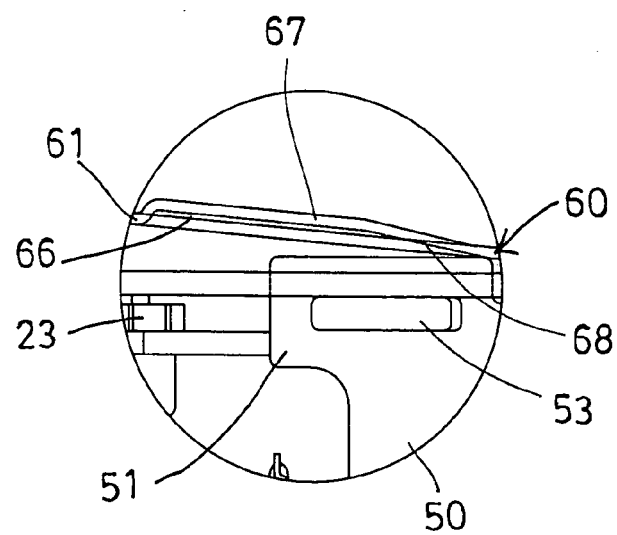
FIG. 8 is an enlarged partial top plan schematic view of the cargo bracing device.
Figure 7:
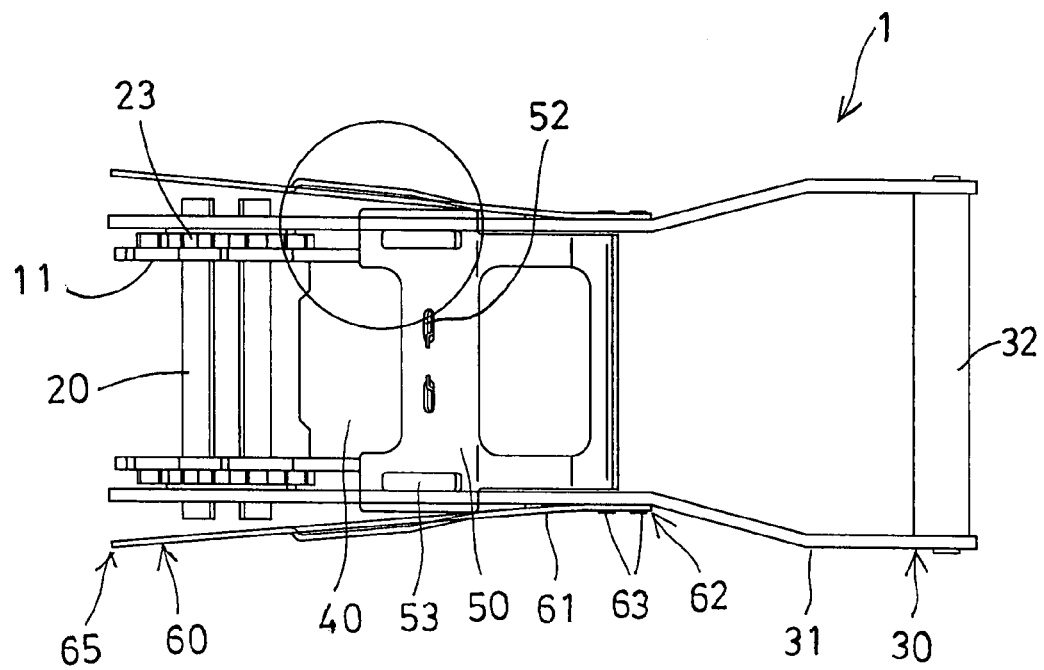

The operating arm 30 may be rotated reversely, i.e. counterclockwise relative to the base 10 when the toothed discs 23 and the reel drum 20 are anchored or positioned or latched by the limbs 41 of the stop 40, and thus for allowing the toothed discs 23 and the reel drum 20 to be forced to rotate relative to the base 10 in the active direction, i.e. clockwise relative to the base 10, by the operating arm 30 and the catch device 50 step by step, in order to wind the belt onto the reel drum 20 step by step. After the belt has been tightly wound onto the reel drum 20 by the operating arm 30, or when required, as shown in FIGS. 7 and 8, the catch device 50 may be moved or pulled against the spring members 52 to selectively move the anchor members 61 outwardly or away from the legs 31 of the operating arm 30 and thus to disengage the anchor members 61 of the anchoring device 60 from the reel drum 20 when required.

When the catch device 50 is pulled against the spring members 52 to selectively open the open portion 35 or the opening 34 of the legs 31 or to selectively disengage the anchor members 61 of the anchoring device 60 from the reel drum 20, the legs 31 of the operating arm 30 are thus allowed to be selectively disengaged from the reel drum 20 and the base 10 or separated from the cargo bracing device 1, and thus to prevent the operating arm 30 of the cargo bracing device 1 from being operated or actuated by unauthorized persons. The typical cargo bracing or tie-down or fastening devices or strapping devices failed to provide an operating arm 30 having two legs 31 selectively disengageable from the reel drum 20 and the base 10 after the belt has been tightly wound onto the reel drum 20 by the operating arm 30.

Figure 11:
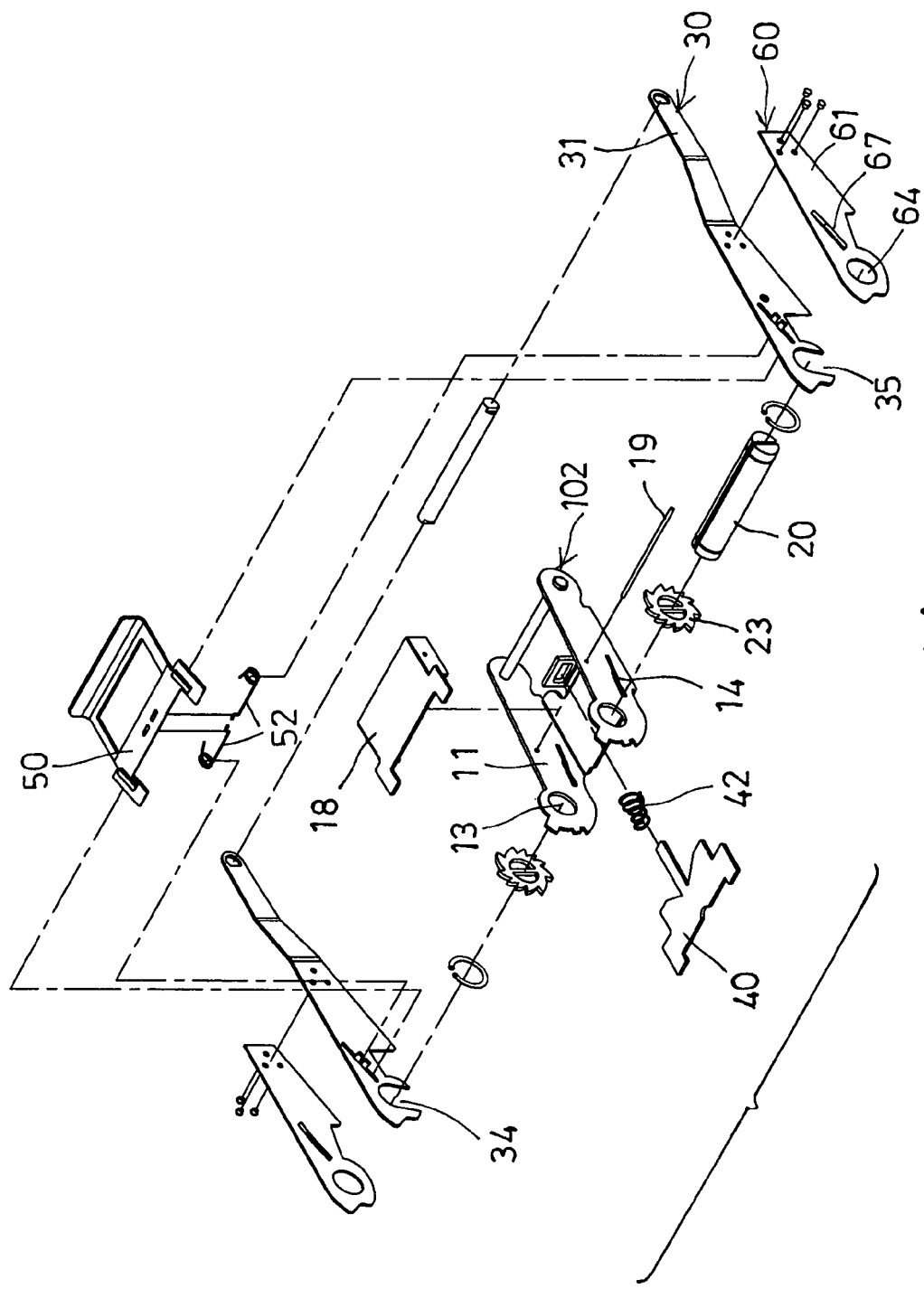
FIG. 11 is another exploded view similar to FIGS. 1, 9, illustrating the further application or arrangement of the cargo bracing device.
Figure 12:
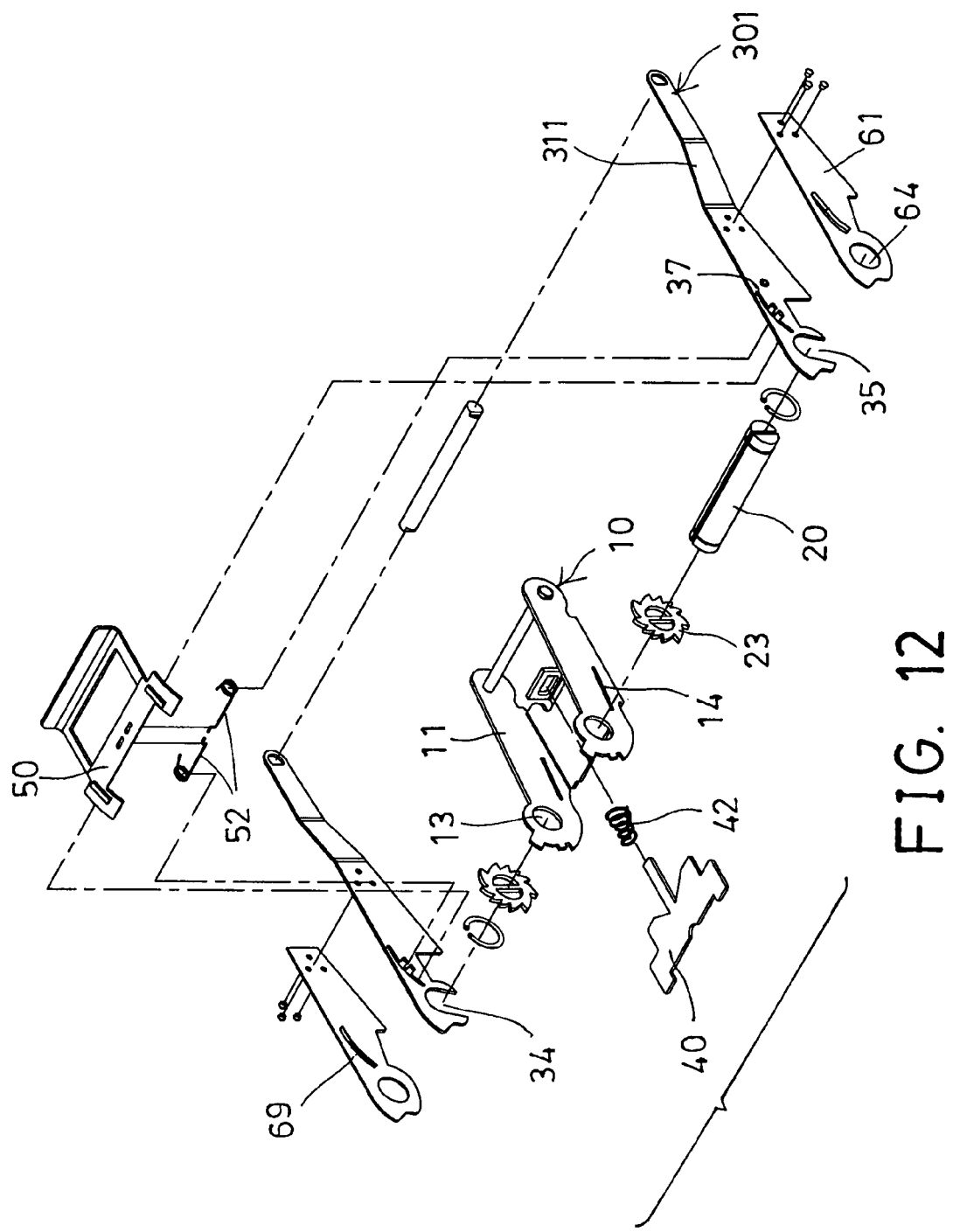
FIG. 12 is a further exploded view similar to FIGS. 1, 9, 11, illustrating the still further application or arrangement of the cargo bracing device.
Figure 13:
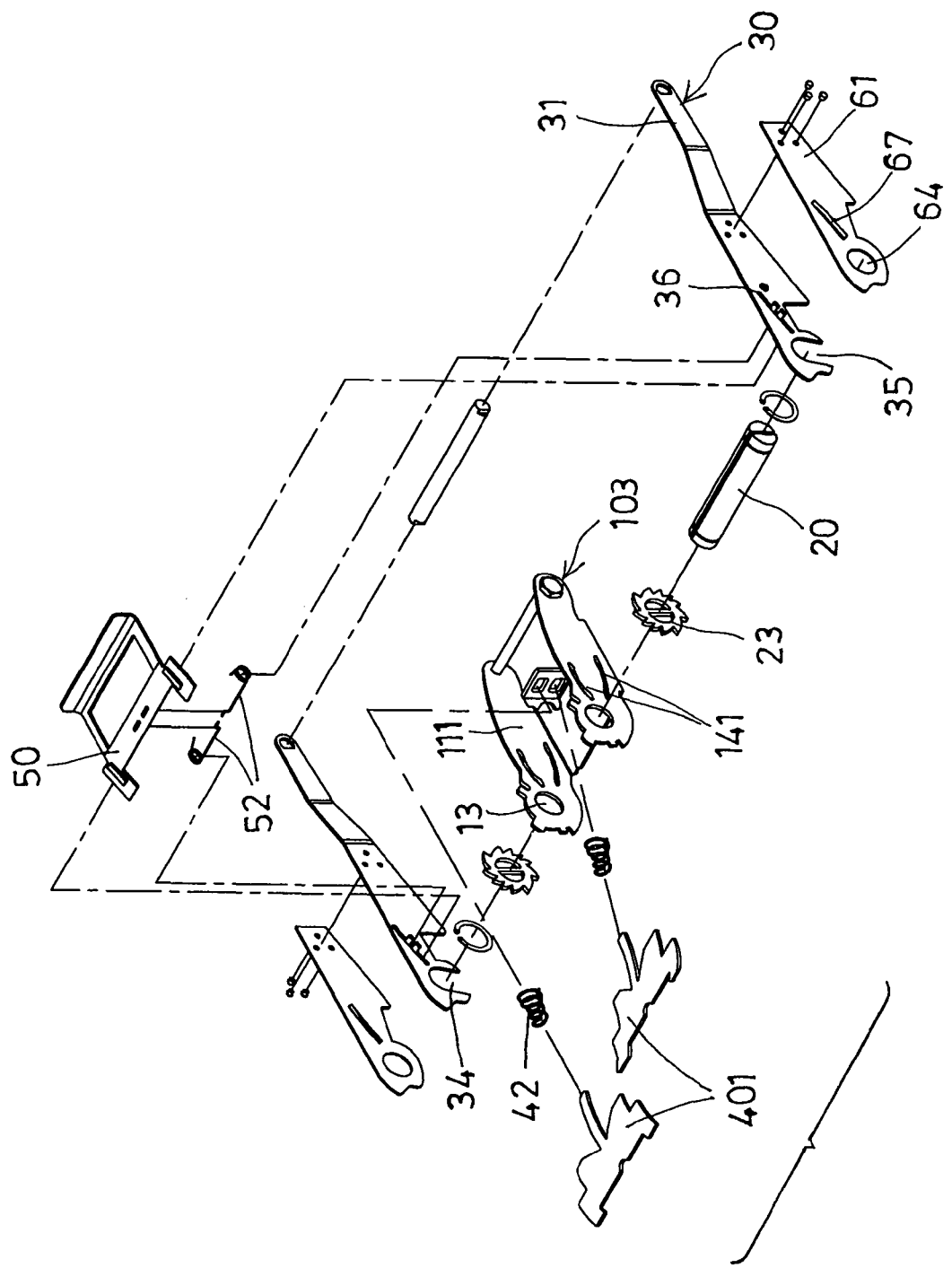
FIG. 13 is a still further exploded view similar to FIGS. 1, 9, 11-12, illustrating the still further application or arrangement of the cargo bracing device.

Alternatively, as shown in FIGS. 9 and 10, the base 101 may include a notch 16 formed in each of the side plates 11, and a protrusion 17 extended into the notch 16 for engaging with the stop 40 and for guiding the stop 40 to slide relative to the side plates 11 of the base 10. Further alternatively, as shown in FIG. 11, the base 102 may include a spring-biased blade 18 pivotally attached to the base 102 with an axle 19 for engaging with the strap and for preventing the strap from being disengaged from the base 102. Further alternatively, as shown in FIG. 12, the operating arm 301 includes a curved groove 37 formed in each of the legs 311 for slidably receiving the spring-biased catch device 50, and the anchor members 611 each also include a curved recess 69 formed therein for slidably receiving the spring-biased catch device 50. Further alternatively, as shown in FIG. 13, the base 103 may include two channels 141 formed in each of the side plates 111 for slidably attaching or receiving two spring-biased stops 401 respectively.

It is to be noted that the typical cargo bracing or tie-down or fastening devices or strapping devices failed to provide an operating arm 30 having two legs 31 selectively disengageable from the reel drum 20 and the base 10 after the belt has been tightly wound onto the reel drum 20 by the operating arm 30, for preventing the cargo bracing device 1 from being operated or actuated by the unauthorized persons and for preventing the cargo from being stolen by the unauthorized persons.

Accordingly, the cargo bracing device in accordance with the present invention includes an actuating handle selectively detached or disassembled or disengaged from the cargo bracing device for preventing the cargo bracing device from being operated or actuated by unauthorized persons.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cargo bracing device comprising:
   a base including two side plates, said side plates each including an orifice formed therein,
   a reel drum rotatably engaged in said orifices of said side plates of said base for rotatably attaching said reel drum to said base,
   at least one toothed disc attached to said reel drum and rotated in concert with said reel drum, and including a plurality of disc teeth provided thereon,
   a spring-biased stop slidably attached to said base and engaged with said disc teeth of said at least one toothed disc, for limiting said at least one toothed disc and said reel drum to rotate relative to said base in an active direction and for preventing said reel drum from being rotated in a reverse direction relative to said base,
   an operating arm including two legs rotatably attached to said reel drum, and including an opening formed in each of said legs for receiving said reel drum and for detachably attaching said legs of said operating arm to said reel drum, and said opening of at least one of said legs including an open portion for allowing said legs to be selectively disengaged from said reel drum,
   a spring-biased catch device slidably attached to said operating arm and engaged with said disc teeth of said at least one toothed disc, for allowing said at least one toothed disc and said reel drum to be rotated relative to said base by said operating arm in the active direction and for preventing said reel drum from being rotated in the reverse direction relative to said base by said operating arm, and
   at least one anchor member attached to one of said legs of said operating arm, and including a perforation formed therein for selectively engaging with said reel drum and for detachably anchoring said legs of said operating arm to said reel drum,
   wherein said spring-biased catch device is engageable with said at least one anchor member for selectively disengaging said perforation of said at least one anchor member from said reel drum when said catch device is moved relative to said operating arm.

2. The cargo bracing device as claimed in claim 1, wherein said at least one anchor member includes a first end secured to said leg of said operating arm, and a second end having said perforation formed therein.

3. The cargo bracing device as claimed in claim 1, wherein said at least one anchor member includes a recess formed therein for slidably receiving said catch device.

4. The cargo bracing device as claimed in claim 3, wherein said at least one anchor member includes a bulge extended outwardly therefrom and having said recess formed therein.

5. The cargo bracing device as claimed in claim 4, wherein said at least one anchor member includes an inclined surface formed in said bulge for engaging with said catch device.

6. The cargo bracing device as claimed in claim 1, wherein said reel drum includes two drum halves spaced away from each other for forming a strap receiving slot between said drum halves, said at least one toothed disc includes two apertures formed therein for receiving said drum halves of said reel drum respectively and for allowing said at least one toothed disc to be rotated in concert with said reel drum.

7. The cargo bracing device as claimed in claim 1, wherein said base includes a channel formed in each of said side plates for slidably attaching said stop.

8. The cargo bracing device as claimed in claim 1, wherein said operating arm includes a groove formed in each of said legs for slidably attaching said catch device.

\* \* \* \* \*